US012399471B1

United States Patent
Selvaraj et al.

(10) Patent No.: US 12,399,471 B1
(45) Date of Patent: Aug. 26, 2025

(54) BUILDING SYSTEM WITH GENERATIVE ARTIFICIAL INTELLIGENCE POINT NAMING, CLASSIFICATION, AND MAPPING

(71) Applicant: Tyco Fire & Security GmbH, Neuhausen am Rheinfall (CH)

(72) Inventors: Krishnamurthy Selvaraj, Büchen (DE); Vikas Sharma, New Delhi (IN); Risavsingh Virendrakumar Saingar, Pune (IN); Abhishek Uday Khardenavis, Pune (IN)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 19/171,855

(22) Filed: Apr. 7, 2025

(30) Foreign Application Priority Data

Apr. 9, 2024 (IN) .............................. 202441028827

(51) Int. Cl.
G05B 13/04 (2006.01)
G05B 13/02 (2006.01)

(52) U.S. Cl.
CPC ......... G05B 13/042 (2013.01); G05B 13/027 (2013.01)

(58) Field of Classification Search
CPC ............................ G05B 13/042; G05B 13/027
See application file for complete search history.

(56) References Cited

U.S. PATENT DOCUMENTS

| 11,567,466 | B1 | 1/2023 | Galvez et al. | |
|---|---|---|---|---|
| 2011/0061015 | A1* | 3/2011 | Drees ................ | H02J 13/00016 700/275 |
| 2021/0200807 | A1 | 7/2021 | Ploegert et al. | |
| 2023/0169220 | A1 | 6/2023 | Ramanasankaran et al. | |
| 2023/0185983 | A1 | 6/2023 | Ramanasankaran et al. | |
| 2023/0213901 | A1 | 7/2023 | Galvez et al. | |
| 2023/0213902 | A1 | 7/2023 | Galvez et al. | |
| 2023/0213903 | A1 | 7/2023 | Galvez et al. | |
| 2023/0213909 | A1 | 7/2023 | Galvez et al. | |
| 2023/0216742 | A1 | 7/2023 | Galvez et al. | |

(Continued)

FOREIGN PATENT DOCUMENTS

WO  WO-2022/194871 A1  9/2022

OTHER PUBLICATIONS

Shin, D, "Building Control and Sensor Power Use Optimization Using a Large Language Model", Technical Disclosure Commons, (Dec. 21, 2023) https://www.tdcommons.org/dpubs_series/6531 (Year: 2023).*

(Continued)

*Primary Examiner* — Christopher E. Everett

(74) *Attorney, Agent, or Firm* — Foley & Lardner LLP

(57) ABSTRACT

A method for a building automation system includes performing data augmentation of a point, equipment, and subtype (PES) dataset using generative artificial intelligence to generate an augmented PES dataset. The method includes fine-tuning at least one large language model (LLM) using the augmented PES dataset, discovering points on a building network for the building automation system, performing PES classification of the points using the at least one fine-tuned LLM, and operating equipment of the building automation system using the PES classification to affect a physical condition of a building.

20 Claims, 7 Drawing Sheets

(56) References Cited

U.S. PATENT DOCUMENTS

| | | | |
|---|---|---|---|
| 2023/0217361 | A1 | 7/2023 | Galvez et al. |
| 2024/0004361 | A1 | 1/2024 | Morris et al. |
| 2024/0012378 | A1 | 1/2024 | Morris et al. |
| 2024/0111263 | A1 | 4/2024 | Namburi et al. |
| 2024/0420214 | A1* | 12/2024 | Wilson .................. G06Q 40/08 |
| 2025/0004428 | A1* | 1/2025 | Anthony ............ G05B 13/0265 |
| 2025/0004450 | A1* | 1/2025 | Anthony ............ G05B 19/4184 |
| 2025/0077882 | A1* | 3/2025 | Luzin .................... G06N 3/092 |
| 2025/0110457 | A1* | 4/2025 | Qiu .................... G05B 13/0265 |

OTHER PUBLICATIONS

Ahn, Ki Uhn, et al. "Alternative approaches to hvac control of chat generative pre-trained transformer (chatgpt) for autonomous building system operations." Buildings 13.11 (2023): 2680. (Year: 2023).*

Song, Lei, et al. "Pre-trained large language models for industrial control." arXiv preprint arXiv:2308.03028 (2023). (Year: 2023).*

Yang, Wu, Wang Junjie, and Li Weihua. "Prospects and Challenges of Large Language Models in the Field of Intelligent Building." Autom. Control Intell. Syst. 11.1 (2023): 15-20. (Year: 2023).*

Dou et al., "Towards Artificial General Intelligence (AGI) in the Internet of Things {IoT}: Opportunities and Challenges," URL: https://arxiv.org/abs/2309.07438, Sep. 14, 2023 (32 pages).

International Search Report and Written Opinion on PCT Appl. No. PCT/IB2025/053665 dated Jun. 18, 2025 (61 pages).

* cited by examiner

BUILDING SYSTEM WITH GENERATIVE ARTIFICIAL INTELLIGENCE POINT NAMING, CLASSIFICATION, AND MAPPING

CROSS-REFERENCE TO RELATED PATENT APPLICATION

This application claims the benefit of and priority to Indian Provisional Patent Application No. 202441028827 filed Apr. 9, 2024, the entire disclosure of which is incorporated by reference herein.

BACKGROUND

The present disclosure relates generally to building management and control systems for building equipment and more particularly to systems and methods for training and executing machine-learning models to automatically generate tags for building devices of a building based on unstructured object data.

Building devices are generally installed and initially configured by contractors that do not utilize standard naming conventions (e.g., object names) for the building devices during configuration. Lacking this information may make configuration of the building devices challenging, because building configuration systems depend on the object name being in a format that is compatible with the building configuration systems and/or otherwise properly classified, commissioned, or configured.

SUMMARY

One implementation of the present disclosure is a method for a building automation system. The method includes performing data augmentation of a point, equipment, and subtype (PES) dataset using generative artificial intelligence to generate an augmented PES dataset. The method includes fine-tuning at least one large language model (LLM) using the augmented PES dataset, discovering points on a building network for the building automation system, performing PES classification of the points using the at least one fine-tuned LLM, and operating equipment of the building automation system using the PES classification to affect a physical condition of a building.

In some embodiments, performing the data augmentation of the PES dataset includes adding synthetic data to the PES dataset, the synthetic data representing behaviors of points in the PES dataset under a plurality of different conditions or scenarios.

In some embodiments, performing the data augmentation of the PES dataset includes adding synthetic points to the PES dataset, the synthetic points associated with a plurality of equipment and subtypes that are not represented in the PES dataset.

In some embodiments, performing the PES classification of the points using the at least one fine-tuned LLM includes applying the at least one fine-tuned LLM in a chain-of-thoughts technique.

In some embodiments, performing the PES classification of the points using the at least one fine-tuned LLM includes generating a description of behaviors or features of the points by executing a first thought of a chain-of-thoughts using the at least one fine-tuned LLM and classifying equipment and subtypes for the points based on the description of behaviors or features of the points by executing a second thought of a chain-of-thoughts using the at least one fine-tuned LLM.

In some embodiments, the method includes deploying the at least one fine-tuned LLM to an edge device installed locally at the building. In some embodiments, performing the PES classification of the points using the at least one fine-tuned LLM includes executing the at least one fine-tuned LLM on the edge device.

In some embodiments, performing the PES classification of the points using the at least one fine-tuned LLM includes augmenting the points with point names, equipment associated with the points, and subtypes of the equipment associated with the points.

In some embodiments, the method includes determining that the at least one fine-tuned LLM is unable to classify a subset of the points, providing the subset of the points to a cloud computing system including one or more artificial intelligence models, and classifying the subset of the points by executing the one or more artificial intelligence models at the cloud computing system.

In some embodiments, the method includes determining that the at least one fine-tuned LLM is unable to classify a subset of the points, providing the subset of the points to user device configured to receive human feedback, and classifying the subset of the points based on the human feedback received via the user device.

In some embodiments, operating the equipment of the building automation system using the PES classification includes mapping the points to one or more setpoints or measured points in a control process based on the PES classification and executing the control process to affect the physical condition of the building.

Another implementation of the present disclosure is a building system including one or more processors and one or more non-transitory computer-readable media storing instructions. When executed by the one or more processors, the instructions cause the one or more processors to perform operations including performing data augmentation of a point, equipment, and subtype (PES) dataset using generative artificial intelligence to generate an augmented PES dataset. The operations further include fine-tuning at least one large language model (LLM) using the augmented PES dataset, discovering points on a building network for the building system, performing PES classification of the points using the at least one fine-tuned LLM, and operating equipment of the building system using the PES classification to affect a physical condition of a building.

In some embodiments, performing the data augmentation of the PES dataset includes adding synthetic data to the PES dataset, the synthetic data representing behaviors of points in the PES dataset under a plurality of different conditions or scenarios.

In some embodiments, performing the data augmentation of the PES dataset includes adding synthetic points to the PES dataset, the synthetic points associated with a plurality of equipment and subtypes that are not represented in the PES dataset.

In some embodiments, performing the PES classification of the points using the at least one fine-tuned LLM includes applying the at least one fine-tuned LLM in a chain-of-thoughts technique.

In some embodiments, performing the PES classification of the points using the at least one fine-tuned LLM includes generating a description of behaviors or features of the points by executing a first thought of a chain-of-thoughts using the at least one fine-tuned LLM and classifying equipment and subtypes for the points based on the description of behaviors or features of the points by executing a second thought of a chain-of-thoughts using the at least one fine-tuned LLM.

In some embodiments, the operations include deploying the at least one fine-tuned LLM to an edge device installed locally at the building. In some embodiments, performing the PES classification of the points using the at least one fine-tuned LLM includes executing the at least one fine-tuned LLM on the edge device.

In some embodiments, performing the PES classification of the points using the at least one fine-tuned LLM includes augmenting the points with point names, equipment associated with the points, and subtypes of the equipment associated with the points.

In some embodiments, the operations include determining that the at least one fine-tuned LLM is unable to classify a subset of the points, providing the subset of the points to a cloud computing system including one or more artificial intelligence models, and classifying the subset of the points by executing the one or more artificial intelligence models at the cloud computing system.

In some embodiments, the operations include determining that the at least one fine-tuned LLM is unable to classify a subset of the points, providing the subset of the points to user device configured to receive human feedback, and classifying the subset of the points based on the human feedback received via the user device.

In some embodiments, operating the equipment of the building system using the PES classification includes mapping the points to one or more setpoints or measured points in a control process based on the PES classification and executing the control process to affect the physical condition of the building.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined, and it will be readily appreciated that features described in the context of one aspect of the invention can be combined with other aspects. Aspects can be implemented in any convenient form. For example, aspects can be implemented by appropriate computer programs, which may be carried on appropriate carrier media (computer readable media), which may be tangible carrier media (e.g., disks) or intangible carrier media (e.g., communications signals). Aspects may also be implemented using suitable apparatuses, which may take the form of programmable computers running computer programs arranged to implement the aspect. As used in the specification and in the claims, the singular form of "a," "an," and "the" include plural referents unless the context clearly dictates otherwise.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Referring generally to the FIGURES, systems and methods for training and executing machine-learning models to convert unstructured object naming data of building devices to a standardized format are disclosed, according to various exemplary embodiments. The systems and methods described herein can access unstructured object naming data captured by building systems that perform a discovery process. For example, a building system (or subsystem, gateway, etc.) may perform a discovery process to identify each building device connected thereto, in order to initiate a configuration process. The results of the discovery process can return object properties for each building device, which may include properties such as building automation and control network (BACnet) object names for the building devices, units for data returned from the building devices, a description of the building devices, an event state corresponding to the building devices, a present value for the building devices, BACnet object types, and service data (e.g., out of service, in service, etc.), among others.

This information, although not readable to a human, can provide insights to the proper standardized name of the building device. The systems and methods described herein can train a machine-learning model, such as a transformer model or a feed-forward neural network, to accurately determine and assign a standardized name to each building device detected in the discovery process. These tags may be stored in a database that catalogs the building devices, and may be transmitted to the building system to overwrite or configure the building devices with the standardized names. Training and executing machine-learning models to learn and automatically assign object names (sometimes referred to herein as "tags") to building devices is a technical improvement to the field of building configuration systems, because humans cannot readily read or configure the building devices due to the nature of the data returned from the building devices. These and other improvements are detailed herein.

Figure 1:
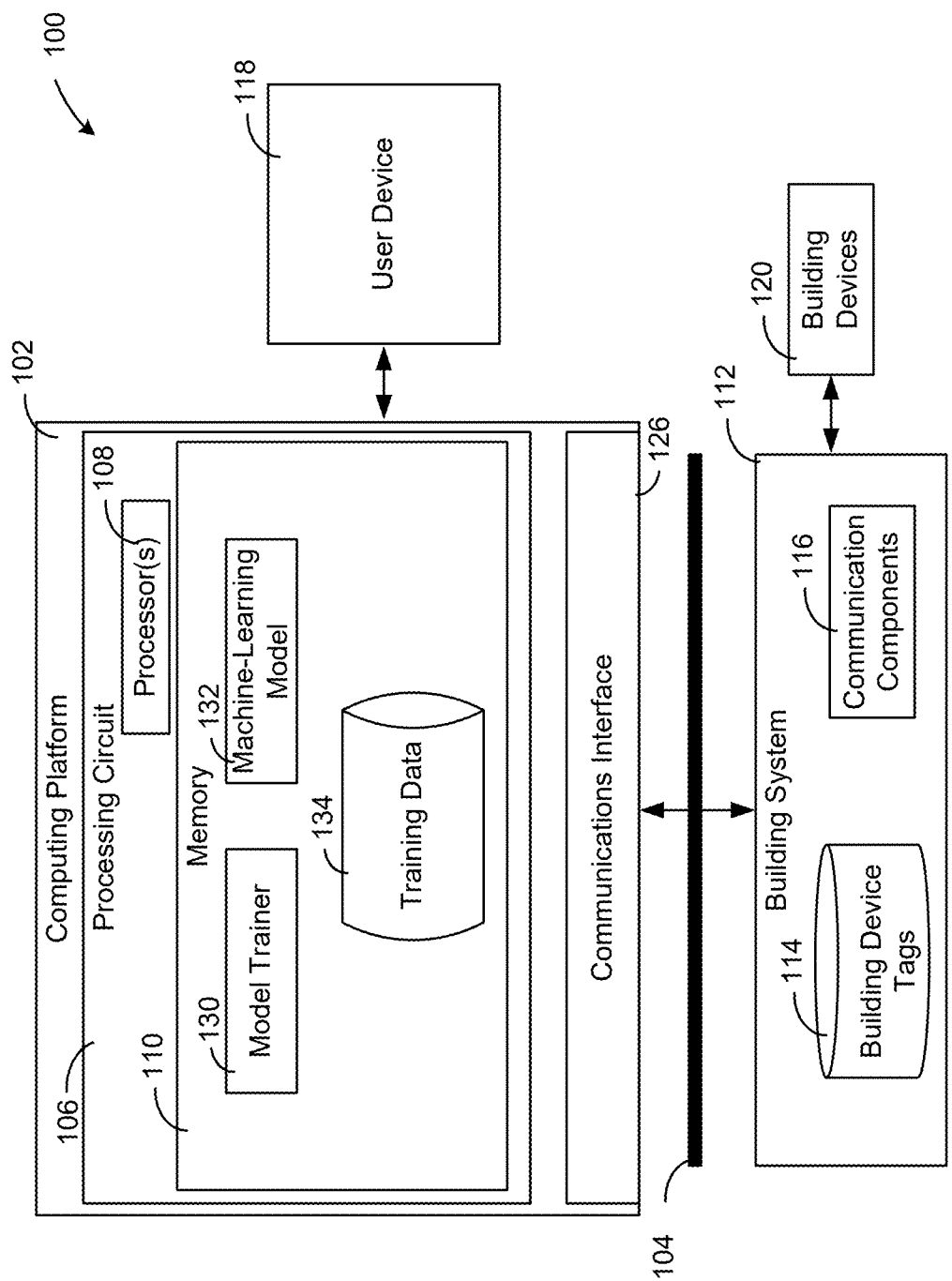
FIG. 1 is a block diagram of a computing platform that may be utilized to train and execute machine-learning models to convert unstructured object names into a standard format, according to some embodiments.

FIG. 1 is a block diagram of a system 100 including a computing platform 102, a building system 112, building devices 120, and a user device 118 that may be utilized to train and execute machine-learning models 132 to convert unstructured object names into a standard format, according to some embodiments. In brief overview of the functionality of the system 100, the computing platform 102 can be configured to train the machine-learning models 132 according to the techniques described herein. Additionally, the computing platform 102 can execute the machine-learning models to assign standardized building device tags 114 to the building devices 120. For example, the building system 112 can perform a discovery process or an information retrieval process (e.g., by executing the communication components 116) to retrieve unstructured data from the building devices 120. The computing platform can retrieve the unstructured data via the communications interface 126, and can execute the machine-learning models 132 to generate the building device tags 114. The building device tags 114 may be communicated by the communication components of the building system 112 to configure the building devices 120 (e.g., by overwriting a current configuration of the building devices 120).

Computing platform 102 is shown to include a processing circuit 106 including a processor 108 and memory 110. The processor(s) 108 can include a general purpose or specific purpose processor, an application specific integrated circuit (ASIC), one or more field programmable gate arrays (FPGAs), a graphical processing unit (GPU), a tensor processing unit (TPU), a group of processing components, or other suitable processing components. The processor(s) 108 can be configured to execute computer code or instructions stored in memory 110 or received from other computer readable media (e.g., CDROM, network storage, a remote server, etc.).

Memory 110 can include one or more devices (e.g., memory units, memory devices, storage devices, etc.) for storing data and/or computer code for completing and/or facilitating the various processes described in the present disclosure. Memory 110 can include random access memory (RAM), read-only memory (ROM), hard drive storage, temporary storage, non-volatile memory, flash memory, optical memory, or any other suitable memory for storing software objects and/or computer instructions. Memory 110 can include database components, object code components, script components, or any other type of information structure for supporting the various activities and information structures described in the present disclosure. Memory 110 can be communicably connected to processor 108 via processing circuit 106 and can include computer code for executing (e.g., by processor 108) one or more processes described herein. When processor 108 executes instructions stored in memory 110, processor 108 generally configures processing circuit 106 to complete such activities.

In some embodiments, computing platform 102 includes a plurality of processors, memories, interfaces, and other components distributed across multiple devices or systems. For example, in a cloud-based or distributed implementation, computing platform 102 may include multiple discrete computing devices, each of which includes a processor 108, memory 110, communications interface 126, model trainer 130, and/or other components of computing platform 102. Tasks performed by computing platform 102 can be distributed across multiple systems or devices, which may be located within a single building or facility or distributed across multiple buildings or facilities. In some embodiments, multiple model trainers 130 are implemented using different processors, computing devices, servers, or other components and carry out portions of the features described herein.

The computing platform 102 is shown to include a communications interface 126. Communications interface 126 can include wired or wireless communications interfaces (e.g., jacks, antennas, transmitters, receivers, transceivers, wire terminals, etc.) for conducting data communications with the building system 112, the building devices 120, or other external systems or devices. Communications conducted via communications interface 126 can be direct (e.g., local wired or wireless communications) or via a communications network 104 (e.g., a WAN, the Internet, a cellular network, etc.).

Communications interface 126 can facilitate communications between computing platform 102 and external applications (e.g., remote systems and applications) for allowing user control, monitoring, and adjustment to computing platform 102 and/or the devices that communicate with computing platform 102. Communications interface 126 can also facilitate communications between computing platform 102 and client devices (e.g., the user device 118, computer workstations, laptop computers, tablets, mobile devices, etc.). Computing platform 102 can be configured to communicate with external systems and devices using any of a variety of communications protocols (e.g., HTTP(S), WebSocket, CoAP, MQTT, etc.), industrial control protocols (e.g., MTConnect, OPC, OPC-UA, etc.), process automation protocols (e.g., HART, Profibus, etc.), home automation protocols, BACnet protocols, or any of a variety of other protocols. Advantageously, computing platform 102 can receive, ingest, and process data from any type of system or device regardless of the communications protocol used by the system or device.

The computing platform 102 can communicate with a building system 112 via a network 104. The network 104 can communicatively couple the devices and systems of the system 100. In some embodiments, the network 104 is at least one of or a combination of a Wi-Fi network, a wired Ethernet network, a ZigBee network, a Bluetooth network, BACnet network, or any other wireless network. The network 104 may be a local area network or a wide area network (e.g., the Internet, a building WAN, etc.) and may use a variety of communications protocols (e.g., BACnet, IP, LON, etc.). The network 104 may include routers, modems, servers, cell towers, satellites, and/or network switches. The network 104 may be a combination of wired and wireless networks. Although only one building system 112 is shown in the system 100 for visual clarity and simplicity, it should be understood that any number of building systems 112 (corresponding to any number of buildings) can be included in the system 100 and communicate with the computing platform 102 as described herein.

The network 104 can be configured to facilitate communication and routing of messages between the computing platform 102, a user device 118, and the building system 112, or any other system. The computing platform 102 can include any of the components described herein, and can implement any of the processing functionality of the devices described herein. In an embodiment, the computing platform 102 can host a web-based service or website, via which the user device 118 can access one or more user interfaces to coordinate various functionality described herein. In some embodiments, the computing platform 102 can facilitate communications between various computing systems described herein via the network 104.

The user device 118 may be a laptop computer, a desktop computer, a smartphone, a tablet, and/or any other device with an input interface (e.g., touch screen, mouse, keyboard, etc.) and an output interface (e.g., a speaker, a display, etc.). The user device 118 can receive input via the input interface, and provide output via the output interface. For example, the user device 118 can receive user input (e.g., interactions such as mouse clicks, keyboard input, tap or touch gestures, etc.), which may correspond to interactions. The user device 118 can present one or more user interfaces described herein (e.g., the user interfaces provided by the computing platform 102) via the output interface.

The user device 118 can be in communication with the computing platform 102 via the network 104. For example, the computing platform 102 can access one or more web-based user interfaces or native application interfaces provided by the computing platform 102 (e.g., by accessing a corresponding uniform resource locator (URL) or uniform resource identifier (URI), etc.). In response to corresponding interactions with the user interfaces, the user device 118 can transmit requests to the computing platform 102 to perform one or more operations, including the operations described in connection with the model trainer 130.

The building system 112 can communicate with the building devices 120, as described herein. The building system 112 can receive messages from the building devices 120 or deliver messages to the building devices 120. For example, the building system 112 may execute one or more of the communication components 116 to communicate with the building devices 120. The communication components 116 can include application programming interfaces (APIs), computer-executable instructions, or other configuration data that facilitate communication with the building devices 120. The building system 112 can include a local configuration, which may include a software configuration or installation, an operating system configuration or installation, driver configuration or installation, or any other type of component configuration described herein.

The building system 112 can perform a discovery process, in which the building system 112 can identify each of the building devices 120 to which it is connected. The building system 112 can communicate with the building devices via the network 104, via a direct communications interface (e.g., a port or connector that communicatively couples one or more of the building devices 120 to the building system 112), or via a second network (e.g., a secondary local network) that is different from the network 104. The building system 112 can poll, transmit requests to, and receive data from each of the building devices 120. The building system 112 can execute the communications components 116 to enumerate each of the building devices 120 in communication with the building system 112.

The building system 112 can then query, poll, or otherwise request (e.g., transmit a request to) each of the building devices to retrieve unstructured data from the building devices 120. The unstructured data can include any data relating to the building devices 120, including but not limited to BACnet object names, units for data returned from the building devices 120, a description of the building devices 120, an event state corresponding to the building devices 120, a present value for the building devices 120, a BACnet object type of the building devices 120, and service data (e.g., out of service, in service, etc.), among others. The building system 112 can receive the unstructured data and store the unstructured data in one or more data structures. The building system 112 can transmit the data structures to the computing platform 102 for classification by the machine-learning models 132 based on the techniques described herein. In some embodiments, the machine-learning models 132 can be provided to the building system 112 by the computing platform 102, and the building system 112 can execute the machine-learning models 132 as described in further detail herein. An example representation of data structures including the unstructured data from the building devices is shown in Table 1 below.

TABLE 1

| Object Name | Present Value | Units | Description | eventState | outOfService |
|---|---|---|---|---|---|
| MMS-NAE4/N2-1.VAV12-4.CLG-O | 60 | % | Cooling Percent Command | normal | false |
| MMS-NAE4/N2-1.VAV12-2.ZN-T | 75 | deg F. | Zone Temperature | normal | false |

The building devices 120 can be any type of device that may operate within a building, including but not limited to air handler units (AHU), variable air volume (VAV) systems, temperature sensors, cameras, water systems, or other types of building devices. The building devices 120 can be any type of device that may be utilized in a building, including but not limited to heating, ventilation, and/or air conditioning (HVAC) devices, chillers, rooftop units, security cameras, networking and communications equipment, access control devices, or devices in spaces of the building such as technology equipment like printers, projectors, or televisions, among others. The building devices 120 can be in communication with the building system 112 via one or more networks, communication interfaces, or connections. The building devices 120 may include memory or may be associated with regions of memory (e.g., data structures) stored by the building system 112. The memory corresponding to the building devices 120 can include unstructured data. The unstructured data may be created when the building devices 120 are installed or initialized. The building devices 120 can provide the unstructured data to the building system 112 or the computing platform 102.

The computing platform 102 may be within the building corresponding to the building devices 120, or may be external (e.g., in a data center, etc.) to the building. Likewise, the building system 112 may be within the building, or may be external to the building and communicate with the building devices 120 of the building via one or more networks. Any suitable protocol may be utilized to provide the unstructured data to the building system 112 or the computing platform 102.

The building system 112 can store one or more building device tags 114, for example, in one or more data structures. The building device tags 114 can include standardized data (e.g., standardized names, data structures, etc.) generated for each of the building devices 120 using the techniques described herein. The building device tags 114 can include standardized names for the building devices 120. The standardized names can be utilized to automatically configure or manage the building devices 120, for example, via the building system 112. In some implementations, the building device tags 114 can be generated by the computing platform 102 by executing the machine-learning model(s) 132. In some other implementations, the building device tags 114 can be generated by the building system 112. Although shown here as being stored solely by the building system 112, it should be understood that each of the building device tags 114 can be stored locally on each respective building device 120.

The building device tags 114 may be updated or changed according to different standards or machine-learning models 132. The building device tags 114 may be generated by the computing platform 102 in response to a request from the building system 112 and provided in response to the request. In some implementations, the computing platform 102 may request the unstructured data corresponding to the building devices 120 and automatically push the building device tags 114 to the building system 112 upon generation. The building system 112 may automatically provide the building device tags 114 to the building devices 120, for example, in one or more configuration messages. The building device tags 114 may be periodically updated, updated according to a schedule, updated upon detecting a change in a standard, updated to reflect a different standard, or updated upon detecting a change in the machine-learning model 132 (e.g., a new version of the machine-learning model 132, a different machine-learning model 132 corresponding to a different standard, etc.). The building device tags 114 may be mapped to one or more schemas, such as the Brick schema, the Haystack schema, or the OpenBlue Data Model (OBDM) schema, for example. Such mapping may be performed by the computing platform 102 or by the building system 112.

Referring now to the operations of the computing platform 102, the computing platform 102 can execute the model trainer 130 to train one or more machine-learning models 132. The model trainer 130 can be implemented in hardware, software, or a combination of hardware and software. The model trainer 130 can execute one or more training algorithms (e.g., backpropagation, gradient descent, optimization of one or more loss values, etc.) to train the machine-learning models 132. The model trainer 130 can execute the training process iteratively, for example, using various batch sizes of the training data 134. The model trainer 130 can implement any type of training process to train the machine-learning model 132. The model trainer 130 can train the machine-learning model using any combination of supervised, unsupervised, self-supervised, or semi-supervised training techniques.

In some implementations, the model trainer 130 can train the machine-learning model 132, or portions (e.g., layers, elements, etc.) thereof, using a supervised or an unsupervised pre-training process followed by supervised learning. In some implementations, the machine-learning model 132 can be trained using only supervised training or only unsupervised training. Training the machine-learning model 132 can include iteratively updating the trainable parameters (e.g., weights, biases, etc.) of the machine-learning model 132 according to a loss value. The loss value can be calculated using a loss function. The loss function can correspond to the difference between the output of the machine-learning model 132 given a particular input data and a ground truth value (e.g., the value that the machine-learning model 132 is trying to predict given the input data) for the input data. Example loss functions include, but are not limited to, focal loss, generalized focal loss, L1 loss, or adaptive loss, among others.

The model trainer 130 can utilize the training data 134 to train the machine-learning model 132. The training data 134 can include a corpus of unstructured data corresponding to various building devices of one or more buildings paired with ground-truth data. The ground truth data in the training data 134 can be standardized name data for the building devices. The standardized name data can include a standardized classification of the building device to which the unstructured name data corresponds in Brick, Haystack, or OBDM format, in some implementations. The training data 134 can be used to adjust the trainable parameters of the machine-learning model 132 to convert the unstructured data from the building devices 120 to standardized name data for each of the building devices. The standardized name data can then be utilized to map the building device 120 data to a schema such as Brick, Haystack, or OBDM, in some implementations (or to any other type of schema).

The machine-learning model 132 can be trained according to the techniques described herein to receive unstructured data corresponding to a building device 120 as input and generate data in a standardized format for the building device 120. For example, the machine-learning model 132 can be trained to translate the unstructured data into a structured format, which may be utilized to configure or manage the building devices 120. In some implementations, the machine-learning model 132 can be trained to output standardized names or tags (classifications) in a format conforming to the Brick, Haystack, or OBDM schemas. In some implementations, the machine-learning model 132 can be trained to output classifications that respectively correspond to Brick, Haystack, or OBDM classes for given input data. In some implementations, the ground truth data in the training data 134 can include standardized data in Brick, Haystack, or OBDM format or classifications corresponding thereto. A non-limiting example representation of a data structure including both unstructured data and a standardized name value for example building devices 120 is shown in Table 2 below.

TABLE 2

| Object Name | Units | Description | Mapped Standard Name |
| --- | --- | --- | --- |
| MMS-NAE4/N2-1.AHU-15.DEHUM-SP | % | Dehumidification Setpoint | RmRelHumSp |
| MMS-NAE4/BACnet IP1.AHU-8.DEHUM-SP | % | Dehumidification Setpoint | RaRelHumSp |
| MMS-NAE4/N2-1.VAV12-3.DMPRPOS | % | Damper Position | InletAirDmpPos |

TABLE 2-continued

| Object Name | Units | Description | Mapped Standard Name |
|---|---|---|---|
| SES-NAE2/N2-1.NC-1HQ ZN45.DPR-POS | % | Damper Position | ZnDmpCmd |

In an embodiment, a portion of the training data 134 utilized by the model trainer 130 can be allocated as a testing set, which can be used to evaluate the accuracy of the machine-learning model 132 during and after training. For example, the training set can be used to train the machine-learning model 132, and periodically (or when a testing condition has been met, e.g., a predetermined amount of the training set has been used to train the machine-learning model 132), the model trainer 130 can propagate items of the testing set (e.g., a subset of the training data 134 that is not utilized to train the model) and compare it with the ground-truth labels for the testing set to evaluate the accuracy of the machine-learning model 132. Items of data in the testing set may be separated from the training set such that items in the testing set have not been used to train the machine-learning model 132.

Figure 2:
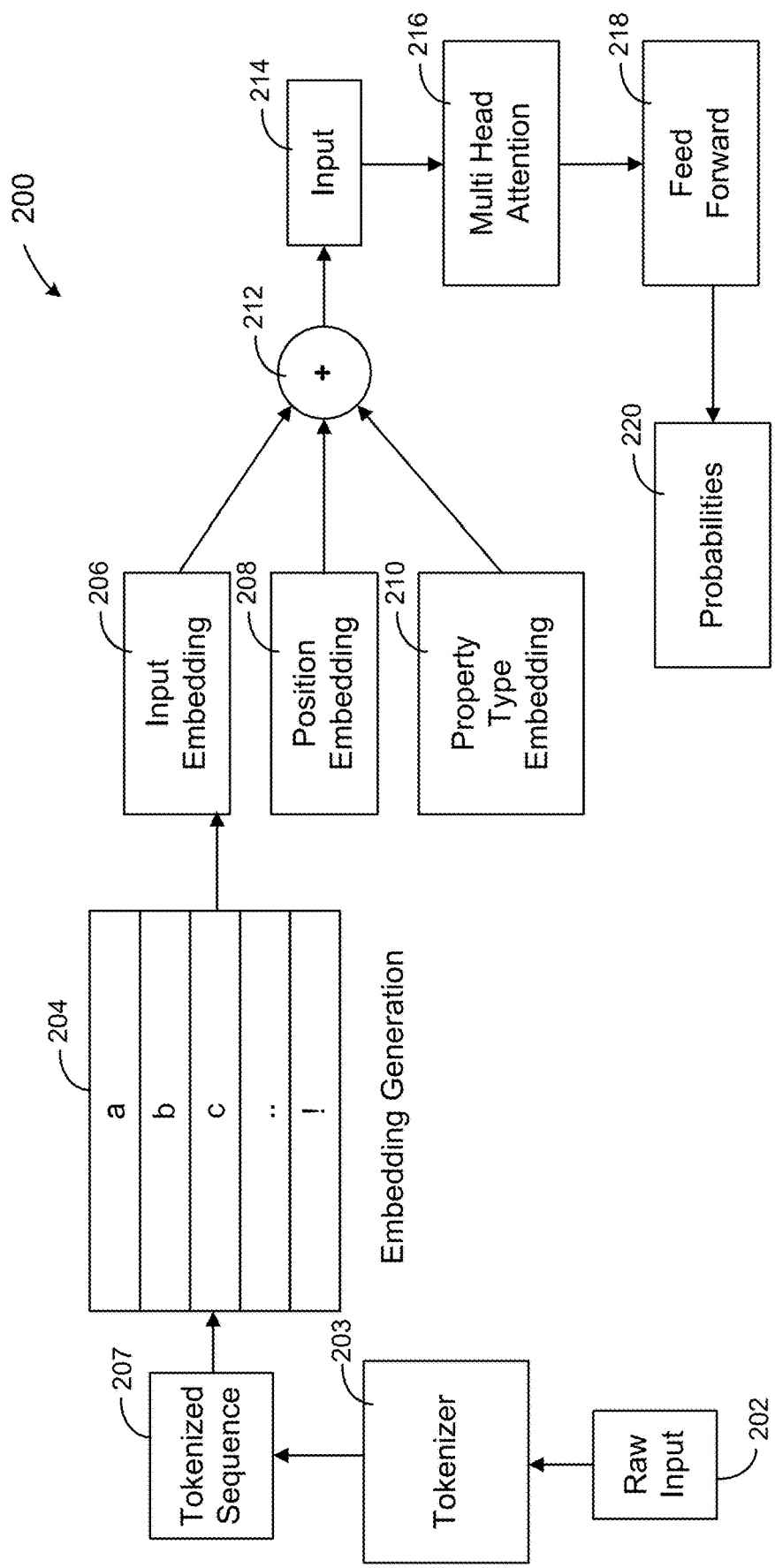
FIG. 2 is a block diagram illustrating an example architecture of a machine-learning model that can be trained and executed based on the techniques described herein to convert unstructured object names into a standard format, according to some embodiments.
Figure 3:
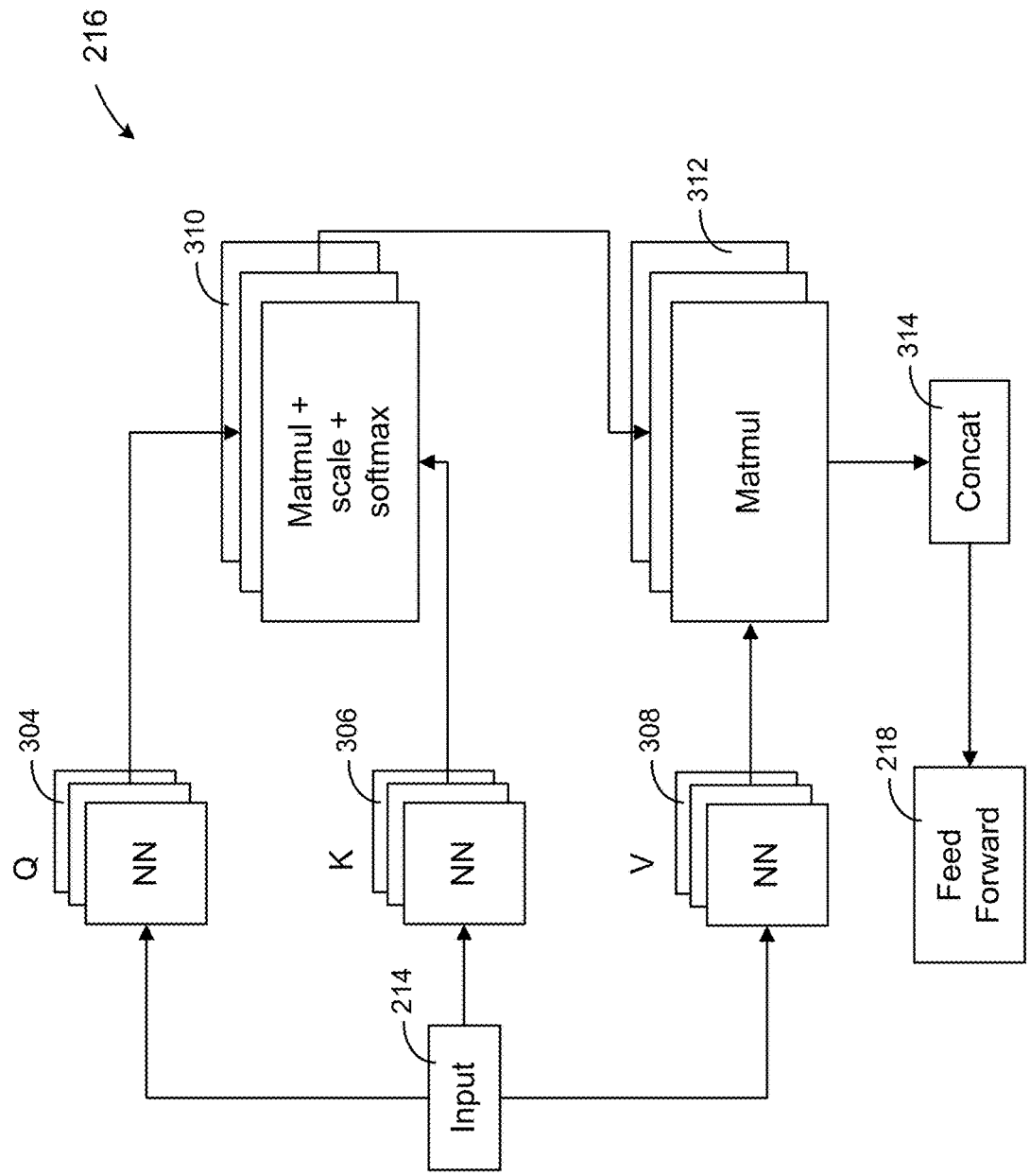
FIG. 3 is a block diagram illustrating an example multi-head self-attention element that may be included in the various machine-learning models described herein, according to some embodiments.
Figure 4:
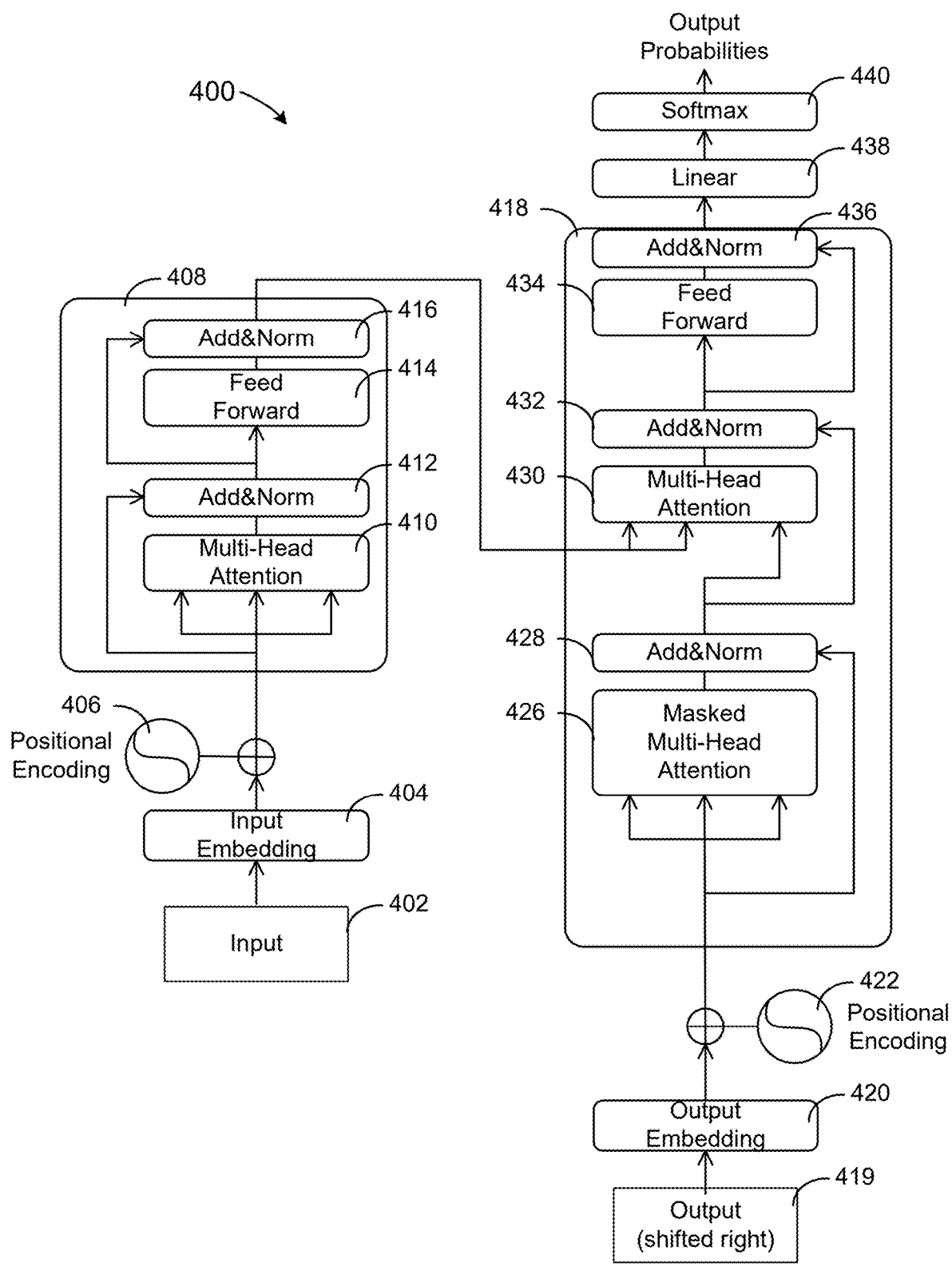
FIG. 4 is a block diagram illustrating an example transformer model that may be utilized to convert unstructured building device object names into a standard format based on the techniques described herein, according to some embodiments.

In some implementations, the model trainer 130 can train the machine-learning model 132 until a training termination condition is met (e.g., a predetermined accuracy threshold has been met, a predetermined amount of training data has been used to train the model, an operator input via the user device 118 has indicated training is terminated, etc.). If the machine-learning model 132 is a multi-stage model, several different types of training algorithms may be utilized to train the various stages or layers of the machine-learning model 132. In some implementations, the computing platform 102 can train multiple machine-learning models 132. For example, a machine-learning model 132 can be trained for a particular building or group of buildings (e.g., associated with a common owner, group, region, or equipment manufacturer). User input via the user device 118 can initiate creation and training of a machine-learning model on a particular corpus of data (e.g., the training data 134). In some implementations, respective sets of training data 134 (e.g., corresponding to different regions, equipment manufacturers, building devices, building systems, buildings, etc.) may be stored for training different machine-learning models 132. Example architectures for the machine-learning model 132 are shown in FIGS. 2, 3, and 4.

In some implementations, the model trainer 130 can utilize a weighted training approach to training the machine-learning model 132. For example, the model trainer 130 can, in some implementations, generate several subsets (e.g., batches, mini-batches) of training data 134 to utilize in training the machine-learning model 132. During training, for each subset of the training data 134, the model trainer 130 can calculate a loss value, as described herein. In some implementations, the model trainer 130 can determine the loss for each subset of training data and utilize the loss value to calculate weights for the subsets of training data 134 that give more emphasis to training subsets that have a higher loss value (e.g., are more challenging for the model to accurately predict/learn).

Subsets of the training data 134 with higher loss values are considered more difficult examples to correctly classify during the training process. By assigning said subsets of training data 134 with higher weight values, the model trainer 130 can cause the machine-learning model 132 to be updated more significantly from more difficult samples.

Various techniques, or combinations of techniques can be utilized to determine weight values used in weighted training.

In one example, the model trainer 130 can assign weights that are inversely proportional to the frequency of each class in the dataset. The model trainer 130 can, in some implementations, dynamically update the weight values assigned to each training sample (or batch of training samples) in the training data 134 based on the performance of the machine-learning model 132. For example, if the machine-learning model 132 is consistently making errors on certain instances, their weights may be increased to improve training performance for those difficult cases. Weights can be assigned on an individual sample basis or on a batch-by-batch basis. Weight values can be used in training by calculating a weighted loss, in which individual losses for each sample or batch of training data 134 are multiplied or otherwise applied to their corresponding weights. The weighted loss, once calculated, can be used to update the parameters of the model, as described herein.

Referring to FIG. 2 in the context of the components of FIG. 1, illustrated is a block diagram illustrating an example architecture of a machine-learning model 200 that can be trained and executed based on the techniques described herein to convert unstructured object names into a standard format, according to some embodiments. The machine-learning model 200 may be utilized as the machine-learning model 132 as described in connection with FIG. 1. In brief overview, the machine-learning model 200 is a multi-head attention model, in which raw input data 202 is converted into input embeddings 206, position embeddings 208, and property type embeddings 210. A combination operation 212 is performed using the input embeddings 206, position embeddings 208, and property type embeddings 210 as input to generate the input data 214 for the multi-head attention layer 216 (described in further detail in connection with FIG. 3). The output of the multi-head attention layer 216 is provided as input to one or more layers of a feed-forward neural network 218, which generates the output predictions of the standardized names (tags) for the raw input data 202.

The raw input data 202 can be, for example, the unstructured data described of the building devices 120. In some embodiments, the raw input data 202 can be pre-processed to conform the data to one or more predetermined data structure formats, in order to make the unstructured data compatible with the machine-learning model 200. For example, the unstructured data may be translated into one or more strings, tokenized into one or more string tokens, or otherwise formatted to be compatible with the embeddings lookup/generation process 204.

In some implementations, the machine-learning model 200 can include one or more tokenizers 203, which can be configured to tokenize and format the raw input data 202 into a format that is compatible with the further processing steps of the machine-learning model 200. The tokenizer 203 can include processor-executable instructions that break down and convert (e.g., divide, group, etc.) the raw input 202 into smaller units referred to as tokens. The tokens can be stored in the tokenized sequence 207, and can be or include phrases, words, sub-words, punctuation symbols, or characters, and can serve as the fundamental elements to be processed by the machine-learning model 200.

The tokenizer 203 can divide the raw input data 202 smaller units. The type of tokens generated by the tokenizer 203 can conform to an input of the machine-learning model 132. In some implementations, the tokenizer 203 can utilize a predefined vocabulary, which may include subwords, symbols, or characters found in utilized in machine-learning training data (e.g., the training data 134). In some implementations, each token can be assigned a numerical representation, which is stored in the tokenized sequence 207. In some implementations, special tokens may also be utilized to convey information about the structure of the raw input 202, including but not limited to indications of the beginning or end of the raw input data 202. Said special tokens may be included in the tokenized sequence 207.

In some implementations, variable-length sequences of raw input data 202 can be processed by adding padding or truncating information to ensure a consistent input size for the machine-learning model 200. In some implementations, "out-of-vocabulary" words, subwords, symbols, or characters, can be implemented by the tokenizer 203 by dynamically generating additional token representations (e.g., numerical values) that correspond to the out-of-vocabulary portions of the raw input data 202. The tokenizer 203 can generate a sequence of encoded tokens 207 that are provided as input to the embeddings generation process 204 of the machine-learning model 200.

The embeddings generation process 204 can be any process in which input embeddings 206 are generated based on the raw input data 202. The input embeddings 206 produced by the embeddings generation process 204 can be word embeddings. Word embeddings are features (e.g., vectors, data structures, binary data, etc.) that are extracted out of text so it can be provided as input into a machine learning model (e.g., the machine-learning model 200). The input embeddings 206 can represent words or portions of strings extracted from the raw input data 202 for text analysis. The input embeddings 206 can include a real-valued vector that encodes the meaning of the raw input data 202.

The input embeddings 206 can be determined by performing the embeddings generation process 204. In some implementations, the embeddings generation process 204 may utilize one or more layers of the machine-learning model 200 to generate corresponding embeddings (e.g., input embeddings 206, position embeddings 208, etc.). The embedding layer can be a machine-learning layer that is trained with other parameters/layers of the machine-learning model 200, and can convert the input token sequence 207 into numerical representations that can be processed by further layers and/or parameters of the machine-learning model 200. The embedding layer(s) can be trained to map one or more tokens in the token sequence 207 to one or more corresponding embedding vectors, which may include the input embeddings 206 and the position embeddings 208.

In some implementations, the embeddings generation process 204 includes a lookup in a lookup table that maps different strings, portions of strings, tokens, or other portions of the tokenized sequence 207 or the raw input data 202 to a respective embedding. In such implementations, the embeddings may be pre-generated and stored in a lookup table. The lookup process may be performed sequentially for each extracted, parsed, or pre-processed portion of the raw input data 202 or the token sequence 207, or the lookup may be performed in parallel for said portions. The embeddings generation process 204 may include the generation of the position embeddings 208. The position embeddings 208 can be real-valued vector values that encode the position of each token in the sequence of tokens 207 generated from the raw input data 202. The position embeddings 208 can therefore represent the position and order of each portion (e.g., string segment, token, etc.) of the raw input data 202.

In some implementations, the embeddings generation process 204 may include generation of the property type embeddings 210. The property type embeddings 210 can be real-value vectors that encode the respective type of property that corresponds to a respective portion of the raw input data 202. For example, as described herein, the raw input data 202 may include a BACnet object name, unit information (e.g., the units used for output data), and a description of the building device 120, each of which are a corresponding type of property (e.g., a "property type") of the respective building device 120 to which the raw input data 202 corresponds. Each of these portions may be split into one or more tokens or string portions based on the presence of one or more characters in the raw input data 202. For example, separate tokens (e.g., portions of strings) may be generated from the description by splitting the description according to SPACE characters, dash characters, slash characters, punctuation characters, or other types of characters. Similar techniques may also be applied to the other types of raw input data 202. Respective property type embeddings 210 may be generated (or looked up in a corresponding lookup table) for each corresponding input embedding 206 of the raw input data 202 based upon the type of property from which the respective input embedding 206 was generated. In some implementations, property type embeddings may not be included, and instead only input embeddings 206 and corresponding position embeddings 208 can be processed by further layers/parameters of the machine-learning model 200.

The combination operation 212 can combine each of the input embeddings 206, the position embeddings 208, and the property type embeddings 210 (if used) into the input data 214. The combination operation 212 can be, for example, a concatenation operation, which concatenates each respective input embedding 206 with its corresponding position embedding 208 and its corresponding property type embedding 210 (if utilized). In some implementations, the combination operation 212 may include generating a data structure that includes each of the input embeddings 206, position embeddings 208, and property type embeddings 210. The data structures can be included in the input data 214, which is formatted (e.g., in a matrix, tensor, vector, another data structure, etc.) to be compatible with the multi-head attention layer 216. The input data 214 can be compound input data that includes each of the input embeddings 206, position embeddings 208, and property type embeddings 210.

The multi-head attention layer 216 can be any type of multi-head attention layer that can be utilized in a transformer-type machine-learning model. The multi-head attention layer 216 can include one or more trained machine-learning layers. The multi-head attention layer 216 can include one or more attention mechanisms (e.g., matrices, trained parameters, etc.) that are executed with input data several times in parallel. The independent attention outputs produced by each attention mechanism executed in parallel can then be concatenated and linearly transformed into an expected dimension of output data (e.g., to match the dimensionality of an input layer of the feed-forward network 218). The multi-head attention layer 216 can be trained to receive the input data 214 as input and generate a corresponding output data structure. The multi-head attention layer 216 can be trained to control the mixing of information between pieces of an input sequence (e.g., the input data 214), leading to the creation of richer representations, which in turn allows for increased performance on machine learning tasks. The multi-head attention layer 216 can be trained using any suitable machine-learning technique, including unsupervised training, supervised training, self-supervised training, or semi-supervised training, among others. The multi-head attention layer 216 can be trained, for example, based on a set of training data (e.g., the training data 134), as described herein. Training the multi-head attention layer 216 can include updating weights or biases according to a loss value calculated using machine-learning techniques. Further details of the multi-head attention layer 216 are described in connection with FIG. 3.

The output of the multi-head attention layer 216 can be provided as input to a feed-forward neural network 218. The feed-forward neural network 218 can be any type of feed-forward or recurrent neural network that can receive the output of the multi-head attention layer 216 and generate one or more output predictions 220. The feed-forward neural network 218 can be or include any number and type of neural network layers, including but not limited to fully connected layers, convolutional layers, activation layers, or soft-max layers, among others. Each layer of the feed-forward neural network 218 can include weights, biases, and other trainable parameters. In some implementations, the loss function used to train the feed-forward neural network 218 may be different from the multi-head attention layer 216. In some implementations, the loss functions used to train the feed-forward neural network 218 may be the same as the multi-head attention layer 216, or may be combined into a single loss value during training (e.g., to train each of the feed-forward neural network 218 and the multi-head attention layer 216 in parallel at the same time, etc.).

The feed-forward neural network 218 can be trained using any suitable machine-learning training technique, including unsupervised training, supervised training, self-supervised training, or semi-supervised training, among others. The feed-forward neural network 218 can be trained, for example, based on a set of training data (e.g., the training data 134), as described herein. The feed-forward neural network 218 can be trained to generate one or more output probabilities 220. The output probabilities 220 can include respective probability values for each possible standardized name for the raw input data 202. The output probabilities 220 may include a vector, with each value in the vector corresponding to a respective probability value (and a corresponding standardized name of a set of standardized names for which the machine-learning model 200 is trained, for example). In some implementations, a soft-max operation can be applied to the output of the feed-forward neural network 218 to generate the output probabilities 220. In some implementations, the standardized name associated with the greatest probability of the output probabilities 220 can be selected as the classification of the standardized name of the raw input data 202. The selected standardized name can be stored in association with the raw input data 202. During training, the output probabilities 220 can be utilized with ground truth data (e.g., the actual standardized name of the raw input data 202) to calculate a loss value, which is used to update the various trainable parameters of the machine-learning model 200 according to a respective optimization and training algorithm (e.g., backpropagation, gradient descent, etc.). The probabilities can each indicate a likelihood of a respective classification of the raw input data 202 (e.g., a Brick, Haystack, OBDM classification, etc.).

Referring to FIG. 3 in the context of the components of FIGS. 1 and 2, illustrated is a block diagram illustrating an example multi-head self-attention layer 216 that may be included in the various machine-learning models described herein (e.g., the machine-learning model 132, the machine-learning model 200, etc.), according to some embodiments. In brief overview of the multi-head attention layer 216, the input data 214 can be split into three main inputs to the attention mechanism: queries 304, keys 306, and values 308. These inputs can all be described in terms of an "information retrieval" system of sorts. A query 304 is submitted for each token in the input sequence. Those queries 304 are then matched against a series of keys 306 (e.g., using the transformation operation 310). Each of the queries 304, keys 306, and values 308 can be stored as respective sets of tensors in the input data 214. In some implementations, the queries 304, keys 306, and values 308 can be duplicates of the input data 214 represented in appropriately sized tensors.

The queries 304, the keys 306, and the values 308 can each be generated based on a separate linear transformation of the same input data (e.g., the input data 214). The linear transformation can be applied by a linear layer (e.g., a matrix, tensor, etc.) that includes a number of trainable weights. The input data 214 can be passed through the respective linear layers (e.g., matrix multiplication, etc.) to produce the queries 304, the keys 306, and the values 308 (e.g., each of which may be a respective data structure, such as a matrix or a tensor). In the multi-head attention layer 216, the queries 304, keys 306, and values 308 input matrices can be broken up by feature into different heads, each of which are responsible for learning a different representation. Each head shares the same linear layer output (e.g., the output of the linear transformation) but operates on its own respective logical section of the data. This logical split is done by partitioning the input data 214 as well as the linear layer weights uniformly across the attention heads. The computations for all heads can therefore be achieved via a single tensor operation rather than requiring N separate operations (e.g., where N is the number of heads in the multi-head attention layer 216).

The queries 304, the keys 306, and the values 308 output by the linear layers can be re-shaped to include an explicit head dimension. Once the queries 304, the keys 306, and the values 308 have been calculated (each of which may be represented as a matrix data structured), a transformation operation 310 can be performed, which may include a matrix multiplication between the queries 304 and the keys 306. The transformation operation 310 can include, following the matrix multiplication, a scaling operation (e.g., by dividing by the square root of the query size) and a subsequent soft-max operation. A second matrix multiplication operation can then be performed between the output of the soft-max operation and the values 308 matrix. This results in separate attention scores for each head, which can be combined into a single score using the concatenation operation 312. The concatenation operation 312 can include concatenating the attention score vectors for each head into a single merged attention score. The output can be a matrix of attention scores corresponding to the dimensionality of the input data 214, which can be provided as input to the feed-forward neural network 218 as described herein. In some implementations (e.g., as described in connection with FIG. 4), the output matrix of attention scores may be provided as input to another type of machine-learning layer, such as an addition and normalization layer.

FIG. 4 is a block diagram illustrating an example transformer model 400 that may be utilized to convert unstructured building device object names into a standard format based on the techniques described herein, according to some embodiments. The transformer model 400 may be utilized as the machine-learning model 132 as described in connection with FIG. 1. The transformer model 400 is shown as a single-layer encoder-decoder transformer model. It should be understood that multiple encoder-decoder layers (e.g., the encoder 408 and the decoder 418) can be utilized in the transformer model 400, but just one is shown for visual simplicity and clarity.

As shown, the encoder 408 can include at least two sub-layers. The first sub-layer includes a multi-head self-attention layer 410 (which may be implemented by the multi-head attention layer 216 of FIG. 3) and an addition and normalization layer 412, which normalizes the sum computed between the input of the first sub-layer and the output generated by the first sub-layer itself, as shown. The second sub-layer includes a fully connected neural network 414, which can include any number of fully connected layers (or other machine-learning layers, such as rectified linear unit (ReLU) layers or other activation layers, softmax layers, etc.). The second sub-layer includes a second addition and normalization layer 416, which normalizes the sum computed between the input of the second sub-layer and the output generated by the second sub-layer itself, as shown.

The encoder 408 of the transformer model 400 can receive the positional encodings 406 and the input embeddings 404 as input. The positional encodings 406 may be similar to the position embeddings 208, and the input embeddings 404 may be similar to the input embeddings 206. The input embeddings 404 and the positional encodings 406 can be generated from the input data 402 (e.g., the raw input data 202), as described herein. The input embeddings 404 and the positional encodings 406 can be concatenated or combined into a single data structure, as shown, prior to being provided as input to the encoder 408. The output of the encoder 408 (e.g., the output of the second addition and normalization layer 416) can be provided as input to the decoder 418, as shown.

The decoder layer 418 receives the output 419 of the previous decoder layer in the decoder stack of the transformer model 400. The output 419 can be utilized to generate one or more output embeddings 420 using an appropriate embeddings generation process and corresponding output positional encodings 422. The output embeddings 420 can be combined with the output positional encodings 422 using techniques similar to those described in connection with the input embeddings 404. As shown, the combined data for the decoder 418 can be provided as input to a first sub-layer of the decoder 418. The first sub-layer can include a second multi-head self-attention layer 426 (e.g., which may be similar to the multi-head attention layer 216). The second multi-head self-attention layer 426 may be followed by a third addition and normalization layer 428, which normalizes the sum computed between the input of the first sub-layer and the output generated by the first sub-layer itself, as shown. The output of the third addition and normalization layer 428 can be provided as input to generate the queries 304 of the third multi-head self-attention layer 430, while the output of the encoder 408 is provided as input to generate the keys 306 and the values 308 of the third multi-head self-attention layer 430. The third multi-head self-attention layer 430 can be part of a second sub-layer of the decoder 418, which includes a fourth addition and normalization layer 432, which normalizes the sum computed between the input of the second sub-layer and the output generated by the second sub-layer itself, as shown.

The output of the second sub-layer can be provided as input to a third sub-layer of the decoder 418, which includes a second fully connected feed-forward neural network 434 and a fifth addition and normalization layer 436. The second fully connected feed-forward neural network 434 can include any number of fully connected layers (or other machine-learning layers, such as rectified linear unit (ReLU) layers or other activation layers, softmax layers, etc.). The fifth addition and normalization layer 436 can normalize the sum computed between the input of the third sub-layer and the output generated by the third sub-layer itself, as shown. The output of the third sub-layer is then provided as input to one or more fully connected neural network layers 438, and subsequently through the softmax layer 440. Additional or alternative machine-learning layers may also be utilized. The softmax layer 440 can generate the output probabilities, which may be similar to the probabilities 220 described in connection with FIG. 2. The output probabilities can be utilized to identify the standardized name for the input data 402, as described herein. In some implementations, the outputs of the transformer model 400 can be identifiers of sequential keywords/classifications for a particular schema (e.g., a Brick class or OBDM class).

The transformer model 400 may be trained according to the training techniques described herein (e.g., by the model trainer 130 of FIG. 1). The transformer model 400 may be utilized as an alternative to, or in addition to, the machine-learning model 200 of FIG. 2. In some implementations, different machine-learning models may be utilized by the computing platform 102 for different types of input data. For example, the transformer model 400 may be utilized for a certain corpus of input data, and the machine-learning model 200 may be utilized for a different corpus of input data. Likewise, each of the machine-learning model 200 and the transformer model 400 may be trained using respective sets of training data 134. The transformer model 400 may be trained using supervised learning, unsupervised learning, semi-supervised learning, or self-supervised learning, among other machine-learning techniques. In some implementations, both the transformer model 400 and the machine-learning model 200 can be executed in parallel using the same input data to generate both standardized name classifications and sequences.

Figure 5:
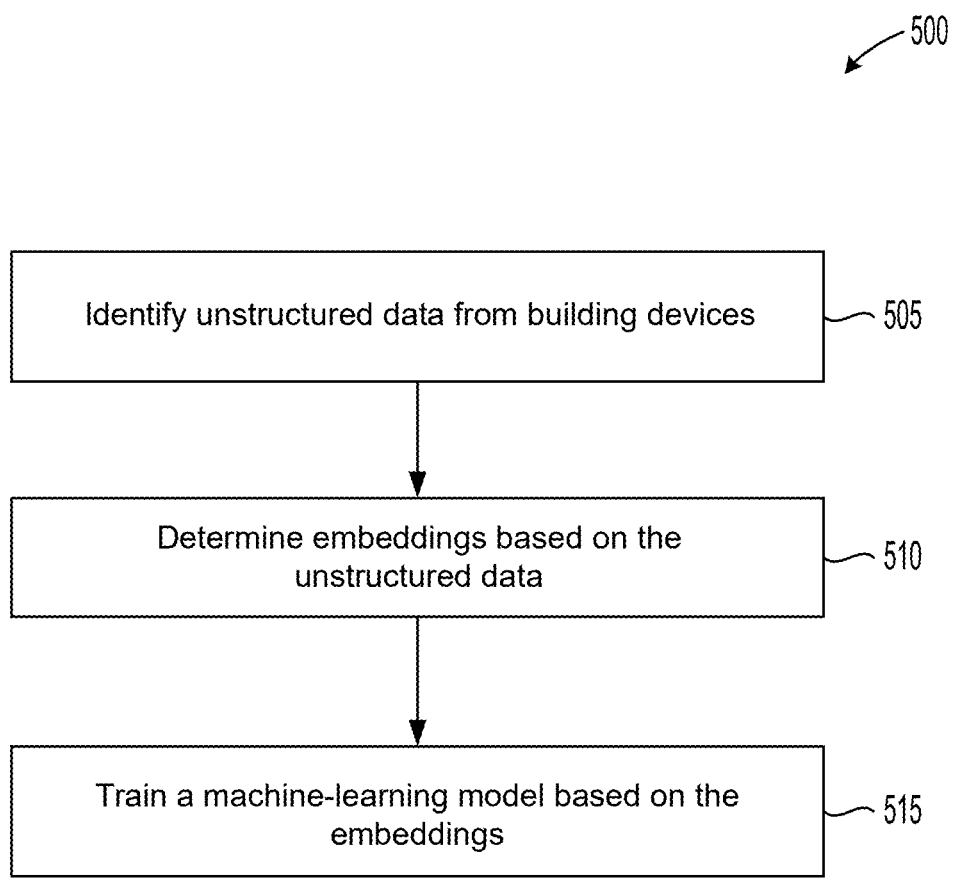
FIG. 5 is a flowchart of an example process for training and executing a machine-learning model to convert unstructured building device object names into a standard format, according to some embodiments.

Referring to FIG. 5 in the context of the components of FIG. 1, illustrated is a flowchart of an example process 500 for training and executing a machine-learning model to convert unstructured building device object names into a standard format, according to some embodiments. The process 500 may be performed, for example, by the computing platform 102 (or any components thereof, such as the model trainer 130), the building system 112, the user device 118, or any other computing device described herein. Although the steps of the process 500 are shown in a particular order, it should be understood that additional steps may be performed, some steps may be omitted, and steps may be performed in a different order, to achieve desired results. To improve computational efficiency, steps may be performed in parallel rather than sequentially.

The process 500 can include identifying unstructured data from the building devices 120. The unstructured data can include, for example, unstructured object names, each associated with a respective object tag (step 505). The unstructured object names can correspond to respective building devices 120 of a building. The respective object tag can be a ground-truth value that indicates the standardized object name for the respective building device 120. This data can be included as part of the training data 134 for training the machine-learning models described herein. The respective object tag may correspond to a schema, such as a Brick, Haystack, or OBDM class or sequence. In some implementations, the unstructured data can be pre-processed prior to training the machine-learning model (e.g., the machine-learning model 132). For example, BACnet object type tags can be generated from the unstructured data (e.g., by extracting and formatting the BACnet object types into a data structure). Similar pre-processing techniques can be utilized to generate unstructured object names (e.g., BACnet object names) that are non-standardized. Additional data can also be extracted from the unstructured data, such as units for data returned from the building devices, a description of the building devices, an event state corresponding to the building devices, a present value for the building devices, and service data (e.g., out of service, in service, etc.), among others. To access the unstructured data, a discovery process may be performed, as described herein. In some implementations, to generate the training data 134, the discovery process can be performed for a set of building devices 120 to retrieve the unstructured data as described herein. Ground truth data (e.g., the standardized names, labels, schema classes, etc.) can be received from another computing device (e.g., the user device 118), or from an external database. The known ground truth data may be provided through a manual labeling process. The unstructured data and corresponding ground truth may be stored as part of the training data 134.

The process 500 can include determining embeddings based on the unstructured data (step 510). For example, the embeddings may be determined during training (e.g., during step 515) or generated prior to step 515 to include as part of the training data 134. Various types of embeddings can be generated or otherwise determined from the unstructured data, such as the input embeddings 206, the position embeddings 208, the property type embeddings 210, or the input embeddings 404, among other embeddings described herein. The embeddings can be determined, for example, using a lookup table (e.g., for the input embeddings 206 or the input embeddings 404) that maps input tokens to corresponding embedding values. The lookup table may be retrieved from an external computing system, or from a lookup table database. The lookup in the lookup table may be performed for each token in the pre-processed unstructured data. The lookup table may be referred to as an "embedding table," and may correspond to the machine-learning model for which the embeddings are generated. For example, lookups can be performed for the BACnet object name, the BACnet object type, and the units data for a respective building device to generate corresponding input embeddings for that object device. Position embeddings and property type embeddings can also be generated for the building device as described herein, and similar approaches may be utilized to generate corresponding property type embeddings.

In some implementations, the machine-learning models described herein (e.g., the machine-learning model 132, the machine-learning model 200, the machine-learning model 300, the machine-learning model 400, etc.) can be any transformer-type model, including a Bidirectional Encoder Representations from Transformers (BERT) model, a large language model (LLM), or a linear regression model, or variants thereof, among others. In one example, the machine-learning models described herein can include a "Distilled BERT" (DistilBERT) model, which may be a pre-trained model that is fine-tuned according to the training techniques described herein.

The process 500 can include training a machine-learning model (e.g., the machine-learning model 132, the machine-learning model 200, the transformer model 400, etc.) based on the embeddings determined in step 510 (step 515). The machine-learning model 132 can be trained to generate a standardized object class and/or one or more standardized sequential keywords in a building schema (e.g., Brick, Haystack, OBDM, etc.) for a respective building device based on unstructured data provided by the respective building device. Training the machine-learning model 132 can be based on the embeddings including the position embedding and the respective ground-truth object tag associated with the unstructured data corresponding to a respective building device. The machine-learning model can be trained to generate standardized object tags for the building devices, as described herein.

Training the machine-learning model can include iteratively updating the trainable parameters (e.g., weights, biases, etc.) of the machine-learning model according to a loss value. The loss value can be calculated using a loss function. The loss function can correspond to the difference between the output of the machine-learning model given a particular input data (e.g., input unstructured data corresponding to a building device 120) and a ground-truth value (e.g., the ground-truth object tag for the building device, which the machine-learning model is being trained to predict given the input data). Example loss functions include, but are not limited to, focal loss, generalized focal loss, L1 loss, or adaptive loss, among others.

The training data 134 can be used to train the machine-learning model, as described herein. The training data 134 can be used to adjust the trainable parameters of the machine-learning model to convert the unstructured data of the building devices 120 to standardized name data (e.g., a classification and/or sequential keywords corresponding to a building schema) for each of the building devices 120. In some implementations, the standardized name data can then be utilized to map the building device 120 data to a schema such as Brick, Haystack, or OBDM. The machine-learning model can be trained according to the techniques described herein to receive unstructured data corresponding to a building device 120 as input and generate data in a standardized format for the building device 120. For example, the machine-learning model can be trained to translate the unstructured data into a structured format, which may be utilized to configure or manage the building devices 120.

The machine-learning model may include a transformer model (e.g., the machine-learning model 200 or the machine-learning model 400). The transformer model may include a multi-head attention layer (e.g., the multi-head attention layer 216 of FIG. 3). The machine-learning model may include one or more feed-forward neural network layers, as described in connection with FIGS. 2 and 4. In some implementations, both the machine-learning model 200 and the machine-learning model 400 may be trained in parallel using the same training data to train two models, one of which is trained to generate a classification and the other of which is trained to generate sequential keywords for a Brick, Haystack, or OBDM schema. In some implementations, the machine-learning model can be trained to output standardized names or tags in a format conforming to the Brick, Haystack, or OBDM schemas. In such implementations, the ground truth data in the training data 134 can include standardized data in Brick, Haystack, or OBDM format.

In some implementations, a portion of the training data 134 can be allocated as a testing set, which can be used to evaluate the accuracy of the machine-learning model during and after training. For example, the training set can be used to train the machine-learning model, and periodically (or when a testing condition has been met, e.g., a predetermined amount of the training set has been used to train the machine-learning model), the testing set (e.g., a subset of the training data 134 that is not utilized to train the model) can be propagated through the models and compared with the ground-truth labels for the testing set to evaluate the accuracy of the machine-learning model. Items of data in the testing set may be separated from the training set such that items in the testing set have not been used to train the machine-learning model.

Once trained, the machine-learning model may be executed to determine standardized naming format data for building devices 120 that did not provide unstructured data for inclusion in the training data 134. To do so, the computing platform 102 can retrieve unstructured data corresponding to said building devices, as described herein, pre-process the unstructured data, and propagate the unstructured data through the machine-learning model. In implementations where multiple machine-learning models are utilized (e.g., to generate the classification and the sequence of keywords), the pre-processed unstructured data can be propagated through each of the machine-learning models in parallel to generate the aforementioned outputs. Propagation of the unstructured data through the models includes embedding generation, as described herein, and propagation of the data through the machine-learning by executing the operations of each layer on the corresponding input data, providing the results of the operations to the next layer of the machine-learning model until an output is generated. This process is similar to the techniques used during training, except that, during inference, no ground-truth data is available, and therefore the machine-learning model is not necessarily updated based on the output.

The standardized object name data generated using the trained machine learning model(s) can be utilized to perform one or more operations based on data associated with the building devices. In some implementations, the computing platform can analyze data associated with the building devices to generate control signals for controlling one or more of the building devices. The control signals may include or otherwise identify the building devices by the generated standard object names. The control signals may include operational signals or instructions to activate, deactivate, or modify one or more operational parameters of a building device. The operational parameters can include set points, activation schedules, or associations with other building devices of the building (e.g., in a building schema). The control signals may include additional data associated with the building devices identified by the generated standardized object names in the building schema.

In some implementations, the computing platform can generate one or more alerts based on data associated with the devices. The alerts may include maintenance information, diagnostic data, log files, sensor data, operational data, or any other information that may be produced by the building devices. The one or more alerts can identify the respective standardized object name of the building device to which the alert corresponds. In some implementations, the computing platform can generate an alert that identifies a building device by the standardized object name upon detecting a failure condition of the building device. The failure condition may be self-reported by the building device (e.g., via one or more transmissions), or may be detected in response to one or more anomalous signals (or lack of signals) from the building device.

In some embodiments, various data discussed herein may be stored in, retrieved from, or processed in the context of digital twins. In some such embodiments, the digital twins may be provided within an infrastructure such as those described in U.S. patent application Ser. No. 17/134,661 filed Dec. 28, 2020, Ser. No. 18/080,360 filed Dec. 13, 2022, and Ser. No. 17/537,046 filed Nov. 29, 2021, the entireties of each of which are incorporated herein by reference. For example, one or more operations of the computing platform may be performed to modify one or more digital twins to include standardized object names generated using machine learning models, as described herein.

In some embodiments, various data discussed herein may be processed at (e.g., processed using models executed at) a cloud or other off-premises computing system/device or group of systems/devices, an edge or other on-premises system/device or group of systems/devices, or a hybrid thereof in which some processing occurs off-premises and some occurs on-premises. In some example implementations, the data may be processed using systems and/or methods such as those described in U.S. patent application Ser. Nos. 17/710,458, 17/710,782, 17/710,743, 17/710,775, 17/710,535, and 17/710,542 (all filed Mar. 31, 2022), and U.S. Provisional Patent No. 63/411,540 filed Sep. 29, 2022, which are all incorporated herein by reference in their entireties. For example, one or more operations of the computing platform may be implemented by various gateway components or software, which may be retrieved from or provided by a cloud system. In some implementations, operations described herein as being performed by the computing platform may be performed by one or more edge devices. For example, the machine-learning model may undergo an edgification process, which may enable the machine-learning model to execute efficiently on various edge devices (e.g., the building devices 120) of the building.

Figure 6:
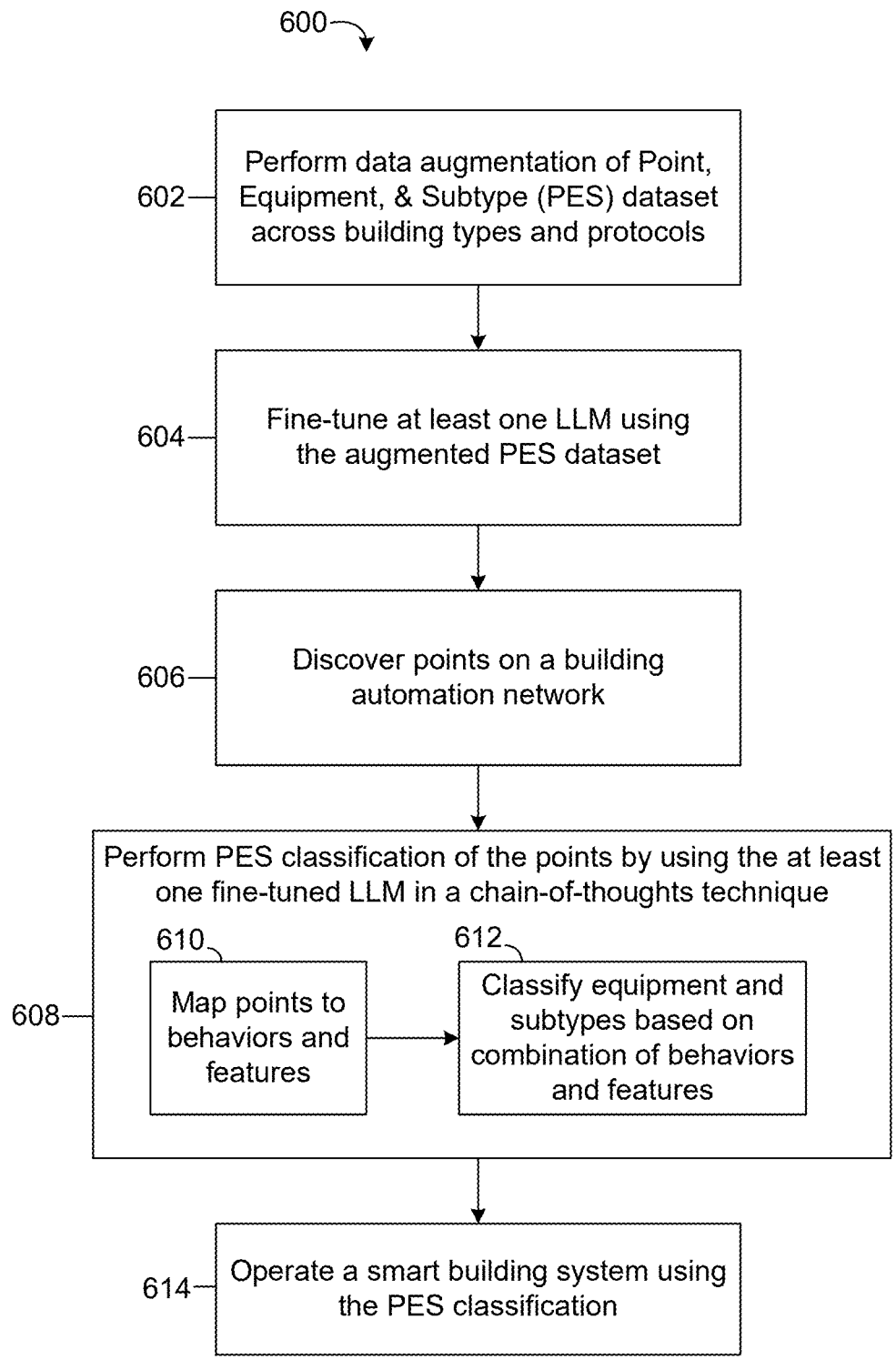
FIG. 6 is a flowchart of an example process for providing point, equipment, and subtype classification of points on a building network, according to some embodiments.

Referring now to FIG. 6, a flowchart of a process 600 for providing point, equipment, and subtype (PES) classification for points in a building automation network, according to some embodiments. Process 600 can be executed by the computing platform 102, for example by one or more edge devices and/or cloud devices according to various embodiments. Process 600 can be implemented using systems, devices, workflows, models, and/or techniques shown in FIG. 7 and described below.

At step 602, data augmentation of a point, equipment, and subtype (PES) dataset is performed across building types and protocols. Step 602 can include obtaining real (e.g., actual, historical, sample, etc.) PES data, for example PES data relating to existing building automation systems which have had PES data configured by human subject matter experts. The real PES data may include sets of points which have been labeled, tagged, classified, or otherwise associated with corresponding equipment and subtypes. For example, a particular point (e.g., a measured point from a sensor, a setpoint for a device of equipment, etc.) may be associated with various types of equipment such as chillers, air handling units (AHUs), valves, actuators, thermostats, boilers, fans, dampers, variable air volume (VAV) units, cameras, electrical equipment, routers, elevators, access control systems, or any other type of equipment which can be used in a building system. The subtype associated with the point may indicate a particular subtype of the equipment. For example, if the equipment is a chiller, the subtype may indicate a particular subtype of chiller (e.g., centrifugal chiller, air-cooled chiller, dry expansion (DX) chiller, heat recovery chiller, etc.). As another example, if the equipment is an AHU, the subtype may indicate a particular subtype of AHU (e.g., modular AHU, custom AHU, horizontal AHU, packaged AHU, rooftop AHU, vertical AHU, etc.).

Step 602 can also include augmenting the real, sample PES data using generative artificial intelligence ("generative AI" or "Gen AI"), for example using at least one large language model (LLM) to generate an augmented PES dataset. For example, in step 602, a generative AI tool can be used to generate additional PES data based on the sample, real data, so as to build a larger PES dataset than would be available if real sample data were used without data augmentation in step 602. In some embodiments, generative AI is used in step 602 to generate lists of equipment of various subtypes and points associated with the equipment and subtypes, along with synthetic data representing behavior of such points under a variety of different conditions or scenarios (e.g., different control scenarios, different operating modes, different ambient conditions, etc.). In some embodiments, the synthetic data added to the PES dataset in step 602 includes additional synthetic points associated with different types of equipment and subtypes that are not represented in the PES dataset and/or do not exist in the real building system. Step 602 can be executed across (for, including, etc.) a large number of building types and protocols, so as to generate an augmented PES dataset representing many, most, substantially all, etc. possible point, equipment, and subtype combinations and/or scenarios to be encountered by subsequent steps of process 600.

At step 604, at least one LLM is fine-tuned using the augmented PES dataset from step 602. Fine-tuning the at least one LLM can be performed in a manner that tunes the LLM to perform a PES classification of points discovered in a building automation system. That is, the at least one LLM can be fine-tuned in step 604 to perform a PES classification task. The at least one LLM can be fine-tuned to perform the PES classification task using a chain-of-thoughts approach. Chain-of-thoughts is a technique used to enhance the reasoning capabilities of LLMs which breaks down multi-step problems into intermediate steps, allowing LLMs to perform complex reasoning tasks that cannot be solved with standard prompting techniques. In the context of the process 600, the chain-of-thoughts can be used by the LLM, for example, to map a point to behaviors and features in a first thought or set of thoughts, and then to classify equipment and subtypes based on the behaviors and features in a subsequent thought or set of thoughts. LLM fine-tuning can be performed using the various training techniques described herein, in various embodiments. The LLM fine-tuned in step 604 may be the same or different as the generative AI model used for data augmentation in step 602.

At step 606, points are discovered on a building automation network. Point discovery can be performed using various point discovery techniques, in various embodiments. Point discovery can include discovering points (e.g., data sources, equipment, objects, sensors, devices, etc.) on the building network. At the point discovery stage of step 606, at least some of the points may be unnamed and/or accompanied by meaningless, generic, or unstructured point names. Point discovery in step 606 can include receiving building data for the points, for example digital or analog values provided as data by the discovered points. The building data discovered for the points can include a variety of structured or unstructured data including, for example, object names (e.g., BACnet object names), present values of the points, units for the present values, descriptions of the points and/or corresponding building devices, event states corresponding to the points or building devices, BACnet object types of the points or building devices, and service data (e.g., out of service, in service, etc.), among others. In some embodiments, the building data includes some or all of the data shown in Table 1 or Table 2 above.

At step 608, a PES classification of the points is performed using the at least one fine-tuned LLM by using the at least one fine-tuned LLM in a chain-of-thoughts technique. Step 608 can include naming each point discovered in step 606 and/or classifying each point discovered in step 606 into an equipment type and subtype. As shown in FIG. 6, the at least one fine-tuned LLM can be deployed in a chain-of-thoughts technique where the at least one fine-tuned LLM is first prompted, in sub-step 610 and as first AI thought or set of AI thoughts, to map points to behaviors and features (e.g., to generate a description of one or more behaviors and features of each point based on discovered data for the points). The behaviors and features generated in step 610 can then be used in a chain-of-thoughts as inputs to sub-step 612 (e.g., a second AI thought or set of AI thoughts) to classify equipment and subtypes for the points (e.g., assigning an equipment type and subtype to each point) based on the combination of behaviors and features generated in sub-step 610. Sub-step 610 and sub-step 612 thereby combine to provide a chain-of-thoughts that classifies points into equipment and subtypes.

At step 614, a smart building system is operated using the PES classification. For example, the PES classification outputs from step 608 can be used to label (e.g., name, sort, commission, configure, etc.) the points discovered in step 606. Once labeled according to the PES classification of process 600, the points become useable in a smart building system for building control (e.g., controlling of equipment to affect physical conditions in a building based on data from labeled points) and monitoring (e.g., fault prediction and detection, energy usage assessment, etc.), among various other functionalities, enabled by the system knowing what conditions, operations, states, etc. the values provided by such points represent as a result of the points classification of process 600. For example, if a point is classified as a setpoint using the PES classification of process 600, step 614 may include adjusting the value of the setpoint to control operation of the equipment associated with the point. As another example, if a point is classified as a measurement from a sensor using the PES classification of process 600, step 614 may include using the measurement as feedback to control the equipment associated with the point. In some embodiments, the PES classification generated in process 600 are used as inputs to the systems and processes of FIGS. 1-5.

Figure 7:
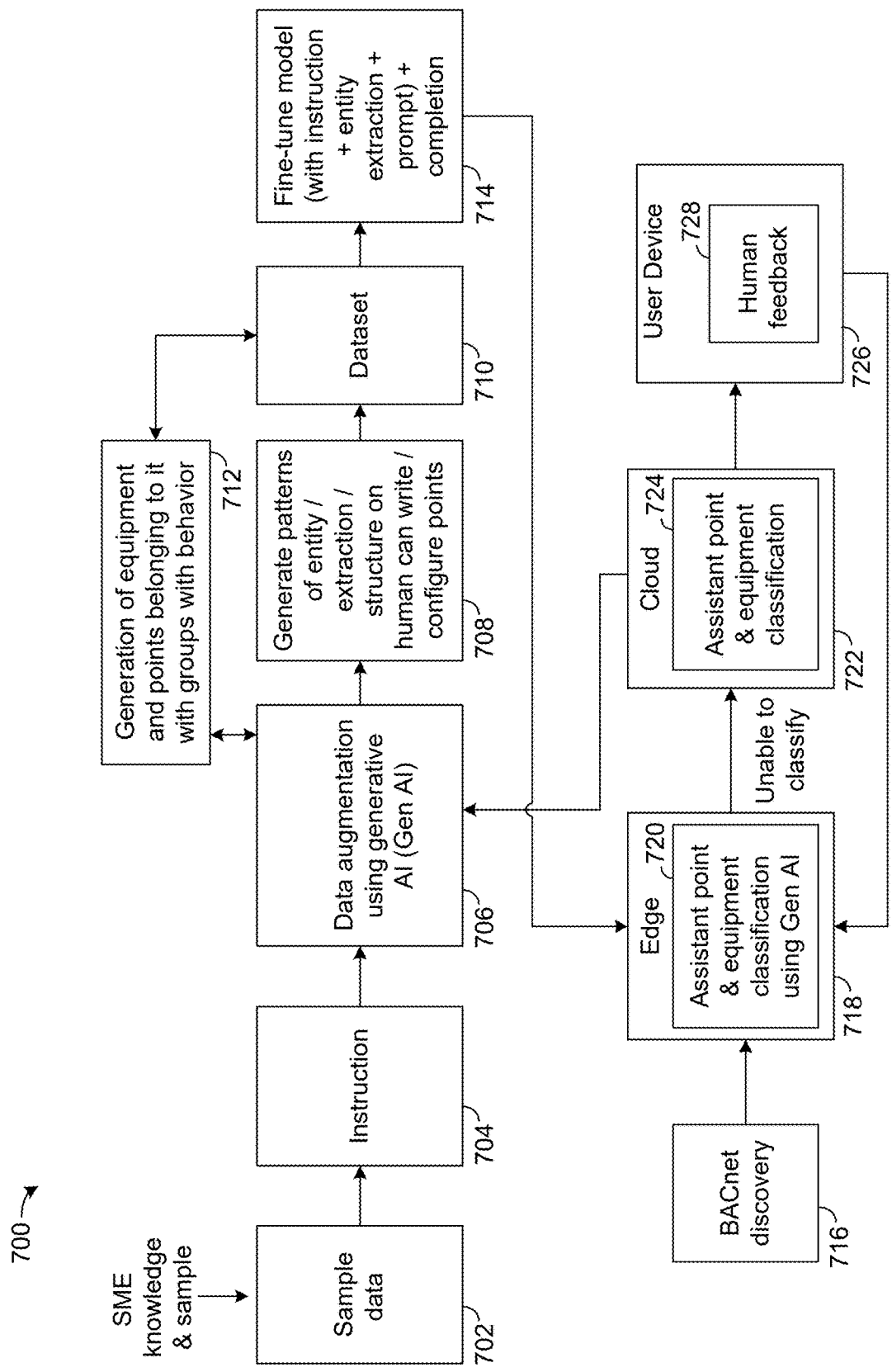
FIG. 7 is a diagram of a workflow and system for providing equipment, and subtype classification of points on a building network, according to some embodiments.

Referring now to FIG. 7, a block diagram of a workflow 700 for providing PES classification is shown, according to some embodiments. The workflow 700 can be deployed to provide the process 600, in various embodiments. In some embodiments, the workflow 700 can be provided in context of building management system onboarding, for example for a new building, renovated building, updated building, building receiving a new management system, etc. The workflow 700 can be deployed together with the automated configuration and commissioning approaches of U.S. patent application Ser. No. 18/215,760 filed Jun. 28, 2023, and U.S.

patent application Ser. No. 18/222,827 filed Jul. 17, 2023, the entire disclosures of which are incorporated by reference herein.

FIG. 7 shows the workflow 700 as initiating from sample data 702, shown as including subject matter expert (SME) knowledge and sample data. For example, the sample data 702 can include points labeled with PES data from existing building automation systems, for example from Metasys® building automation systems by Johnson Controls International plc. At least some such sample data 702 may have been classified manually by a human SME, such that SME knowledge is integrated into the sample data 702.

An instruction 704 is then provided to take the sample data 702 into a generative AI model for data augmentation 706. The instruction 704 can be a prompt for the generative AI model used for data augmentation 706, for example a prompt causing the generative AI model to generate synthetic data based on the sample data 702. The synthetic data may be similar to the sample data 702 and may extrapolate the sample data 702 based on various factors. For example, the data augmentation 706 may generate synthetic data based on the sample data 702 and relating to additional conditions (e.g., variable states or conditions of a building, equipment, systems, etc.), scenarios (e.g., different control scenarios, different disturbance scenarios, etc.), equipment types, subtypes, behaviors, etc. as reflected in the sample data 702. In general, the synthetic data may expand the sample data 702 to encompass a wider variety of equipment, subtypes, conditions, scenarios, behaviors, etc. which could be encountered in a building system.

The data augmentation 706 provides for generation of patterns of entity, extraction, and/or structure, which can be provided together with and/or simulate human write and/or configuring of points (block 708). Such data generation is provided into a dataset 710. The data augmentation 706 also enables a step of generation of equipment and points (e.g., points belonging to such equipment) together with groups with behavior associated with such equipment and points (block 712). Such generation can be provided via interoperation with the generative AI model in data augmentation 706 and the dataset 710 as illustrated in FIG. 7. A dataset 710 which includes the sample data 702 and additional synthetic, artificially generated data is thereby provided via the workflow 700.

The dataset 710 is then shown as being used for model fine-tuning 714. Model fine-tuning 714 can be implemented using the dataset 710, with instruction, entity, prompt, and completion. The model fine-tuned in step 714 can be a large language model, for example a transformer-based model in accordance with the teachings herein. The model in step 714 can be fine-tuned to classify points, equipment, and subtypes based on such information as included in the dataset 710. Model fine-tuning 714 can be performed using unsupervised fine-tuning (USFT) with equipment features and behavior plus supervised fine-tuning (SFTP) to derive a task-specific model to classify the points, equipment, and subtypes. In some embodiments, model fine tuning 714 also includes edgifying the fine-tuned model, i.e., adapting the fine-tuned model for execution on an edge device (e.g., by compressing the model, simplifying the model, reducing the memory or computing requirements for the model, etc.). The fine-tuned model can then be provided for online use in inference time to provide PES classification.

Process 700 is shown as including BACnet discovery 716 or more generally point discovery. BACnet discovery 716 can include discovery of points (e.g., discovery of objects, devices, data sources, equipment, etc.) on a building network, for example via a BACnet protocol. Building networks and/or information technology networks and/or protocols other than or additional to BACnet can used in other embodiments (e.g., ethernet, Zigbee, Modbus, Wi-Fi). As discovered via BACnet discovery 716, the points may be unnamed and/or discovered with arbitrary or non-descriptive names.

BACnet discovery 716 is illustrated in FIG. 7 as being provided into an edge device 718, for example a building controller, building management system server, or other computing device deployed locally at a building site (i.e., at the edge). The edge device 718 is shown as including an assistant 720 for point and equipment classification using generative AI, in particular using the fine-tuned model 714 provided via the workflow 700 as described above. The assistant 720 is able to generate, for the discovered points and as outputs of a process executed using the fine-tuned model, point names, equipment types, and/or subtypes for at least some of the discovered points. In some embodiments, the assistant 720 is provided to auto-fill (e.g., populate, generate, etc.) point names according to a standardized naming convention, for example a naming convention that reflects the data represented by the point, the equipment associated with the point, and the subtype of the equipment associated with the point. At least some points can thereby be named automatically at the edge 718 or otherwise augmented with the generated point names, equipment, and subtypes in response to being discovered via BACnet discovery 716. The point names, equipment, and subtypes can be stored as attributes of the points or otherwise associated with the points in the building management system (e.g., in a relational database).

In some scenarios, as illustrated in FIG. 7, the assistant 720 at the edge 718 may determine that some points (e.g., one or more points, a subset of the points, etc.) cannot be successfully classified and can provide such points to the cloud 722 (e.g., a remote computing system, a remote server, a cloud computing system, etc.) for processing by an assistant 724 for point and equipment classification at the cloud 722. The assistant 724 at the cloud 722 may deploy additional AI models as compared to the assistant 720 and/or otherwise be enabled to classify at least some points which the assistant 720 at the edge 718 was unable to classify. As illustrated in FIG. 7, in some embodiments, point data and/or any naming or classification data can be provided from the cloud 722 to data augmentation 706 and used for further model fine-tuning 714.

In some scenarios, some points remain unclassified (e.g., unnamed, unlabeled, etc.) following operation of the assistant 724 at the cloud 722. Such remaining points can be classified (e.g., named) by human feedback 728 via a user device 726 in communication with the cloud 722 and/or with the edge device 718. Human feedback 728 can also approve, modify, reject, or otherwise provide feedback on names and classifications automatically generated by the assistant 720 and/or the assistant 724.

As illustrated in FIG. 7, the human feedback 728 can be provided to the edge 718, for example such that a fully-classified set of points is received at the edge 718 (e.g., an at least partially automatically-generated set of point names, classifications, etc. together in some embodiments with human modifications, additions, and/or approval of such points names and classifications). The names and classifications can then be used at the edge 718 to provide various locally-executed building control features, smart building features (e.g., predictive setpoint optimization, fault detection, analytics, etc.) and the like. Automated point naming and classification upon point discovery (e.g., BACnet discovery) is thereby provided by the teachings herein. The human feedback 728 can also be used in a feedback loop for the model(s) of the workflow 700 to re-learn in the context of history to provide better classification.

Advantageously, the teachings herein provide the streamlining of the building onboarding process by automating the classification of points and equipment during the asset discovery phase, in some scenarios eliminating current challenges associated with manual mapping and naming for initial configuration and commissioning of building management systems by replacing such manual mapping and naming a generative-AI-powered classification approach at the edge, along with surrounding advantageous processing steps. Teachings within the scope of the present disclosure provide for leveraging historical data from configured building management systems (e.g., building management systems from multiple vendors, of different types, different platforms, etc.), encompassing points, equipment, subtypes, bill of materials, features, behavior, and/or patterns; creating a dataset that serves as a knowledge base, and leveraging it to fine-tune the Language Learning Model (LLM) and generate a task-specific LLM model capable of classifying points, equipment, and subtypes; utilizing the finetuned model along with a chain-of-thoughts approach to replicate the thought process of subject matter experts (SMEs) applying manual mapping knowledge, thereby automating classification using generative artificial intelligence; further refining the LLM model through unsupervised fine-tuning (USFT) using GenAI-generated datasets, incorporating equipment features and behavior, as well as supervised fine-tuning (SFTP), to derive a task-specific model for classifying points, equipment, and subtypes; deploying the generative AI model (e.g., the refined LLM model, the task-specific LLM model) at the edge to classify PES (points, equipment, subtypes) during the building onboarding and discovery phase, utilizing the chain-of-thoughts (CoT) approach; and/or enabling SMEs to provide feedback on the classification process, with the feedback serving as input for model learning and improvement of classification accuracy. This approach facilitates the automated classification of points, equipment, and subtypes and can be deployed for any building types and protocols during the discovery process, thereby reducing time and minimizing manual intervention and legacy dependencies.

The teachings herein may provide for accelerated onboarding of a building management system, for example completing a point, equipment and subtype classification process in less than a day for projects which may take around three months to complete using existing manual classification procedures and can also result in improved accuracy of mapping by elimination or reduction of human errors. Furthermore, edge-based classification according to teachings herein can eliminate the need for data transfer and cloud management. Improved building operations can then be achieved using the efficiently-generated classifications for operation of equipment by building management systems to affect the physical conditions inside buildings served by such systems.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

References to "or" may be construed as inclusive so that any terms described using "or" may indicate any of a single, more than one, and all of the described terms.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed is:

1. A method for a building automation system, comprising:
performing data augmentation of a point, equipment, and subtype (PES) dataset using generative artificial intelligence to generate an augmented PES dataset;
fine-tuning at least one large language model (LLM) using the augmented PES dataset;
discovering points on a building network for the building automation system;
performing PES classification of the points using the at least one fine-tuned LLM; and
operating equipment of the building automation system using the PES classification to affect a physical condition of a building.

2. The method of claim 1, wherein performing the data augmentation of the PES dataset comprises adding synthetic data to the PES dataset, the synthetic data representing behaviors of points in the PES dataset under a plurality of different conditions or scenarios.

3. The method of claim 1, wherein performing the data augmentation of the PES dataset comprises adding synthetic points to the PES dataset, the synthetic points associated with a plurality of equipment and subtypes that are not represented in the PES dataset.

4. The method of claim 1, wherein performing the PES classification of the points using the at least one fine-tuned LLM comprises applying the at least one fine-tuned LLM in a chain-of-thoughts technique.

5. The method of claim 1, wherein performing the PES classification of the points using the at least one fine-tuned LLM comprises:
generating a description of behaviors or features of the points by executing a first thought of a chain-of-thoughts using the at least one fine-tuned LLM; and
classifying equipment and subtypes for the points based on the description of the behaviors or features of the points by executing a second thought of the chain-of-thoughts using the at least one fine-tuned LLM.

6. The method of claim 1, comprising deploying the at least one fine-tuned LLM to an edge device installed locally at the building;
wherein performing the PES classification of the points using the at least one fine-tuned LLM comprises executing the at least one fine-tuned LLM on the edge device.

7. The method of claim 1, wherein performing the PES classification of the points using the at least one fine-tuned LLM comprises augmenting the points with point names, equipment associated with the points, and subtypes of the equipment associated with the points.

8. The method of claim 1, comprising:
determining that the at least one fine-tuned LLM is unable to classify a subset of the points;
providing the subset of the points to a cloud computing system comprising one or more artificial intelligence models; and
classifying the subset of the points by executing the one or more artificial intelligence models at the cloud computing system.

9. The method of claim 1, comprising:
determining that the at least one fine-tuned LLM is unable to classify a subset of the points;
providing the subset of the points to user device configured to receive human feedback; and
classifying the subset of the points based on the human feedback received via the user device.

10. The method of claim 1, wherein operating the equipment of the building automation system using the PES classification comprises:
mapping the points to one or more setpoints or measured points in a control process based on the PES classification; and
executing the control process to affect the physical condition of the building.

11. A building system comprising:
one or more processors; and
one or more non-transitory computer-readable media storing instructions that, when executed by the one or more processors, cause the one or more processors to perform operations comprising:
performing data augmentation of a point, equipment, and subtype (PES) dataset using generative artificial intelligence to generate an augmented PES dataset;
fine-tuning at least one large language model (LLM) using the augmented PES dataset;
discovering points on a building network for the building system;
performing PES classification of the points using the at least one fine-tuned LLM; and
operating equipment of the building system using the PES classification to affect a physical condition of a building.

12. The building system of claim 11, wherein performing the data augmentation of the PES dataset comprises adding synthetic data to the PES dataset, the synthetic data representing behaviors of points in the PES dataset under a plurality of different conditions or scenarios.

13. The building system of claim 11, wherein performing the data augmentation of the PES dataset comprises adding synthetic points to the PES dataset, the synthetic points associated with a plurality of equipment and subtypes that are not represented in the PES dataset.

14. The building system of claim 11, wherein performing the PES classification of the points using the at least one fine-tuned LLM comprises applying the at least one fine-tuned LLM in a chain-of-thoughts technique.

15. The building system of claim 11, wherein performing the PES classification of the points using the at least one fine-tuned LLM comprises:
generating a description of behaviors or features of the points by executing a first thought of a chain-of-thoughts using the at least one fine-tuned LLM; and classifying equipment and subtypes for the points based on the description of the behaviors or features of the points by executing a second thought of the chain-of-thoughts using the at least one fine-tuned LLM.

16. The building system of claim 11, the operations comprising deploying the at least one fine-tuned LLM to an edge device installed locally at the building;
   wherein performing the PES classification of the points using the at least one fine-tuned LLM comprises executing the at least one fine-tuned LLM on the edge device.

17. The building system of claim 11, wherein performing the PES classification of the points using the at least one fine-tuned LLM comprises augmenting the points with point names, equipment associated with the points, and subtypes of the equipment associated with the points.

18. The building system of claim 11, the operations comprising:
   determining that the at least one fine-tuned LLM is unable to classify a subset of the points;
   providing the subset of the points to a cloud computing system comprising one or more artificial intelligence models; and
   classifying the subset of the points by executing the one or more artificial intelligence models at the cloud computing system.

19. The building system of claim 11, the operations comprising:
   determining that the at least one fine-tuned LLM is unable to classify a subset of the points;
   providing the subset of the points to user device configured to receive human feedback; and
   classifying the subset of the points based on the human feedback received via the user device.

20. The building system of claim 11, wherein operating the equipment of the building system using the PES classification comprises:
   mapping the points to one or more setpoints or measured points in a control process based on the PES classification; and
   executing the control process to affect the physical condition of the building.

\* \* \* \* \*